(12) United States Patent
Kumagai et al.

(10) Patent No.: US 12,163,364 B2
(45) Date of Patent: Dec. 10, 2024

(54) ROLLER

(71) Applicant: DAIDO METAL COMPANY LTD., Nagoya (JP)

(72) Inventors: Yuichi Kumagai, Inuyama (JP); Yohei Takada, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 18/049,442

(22) Filed: Oct. 25, 2022

(65) Prior Publication Data

US 2023/0128110 A1 Apr. 27, 2023

(30) Foreign Application Priority Data

Oct. 27, 2021 (JP) ................................. 2021-175155

(51) Int. Cl.
| | | |
|---|---|---|
| *E05D 15/06* | (2006.01) | |
| *B29C 45/00* | (2006.01) | |
| *B29C 45/14* | (2006.01) | |
| *B29K 77/00* | (2006.01) | |
| *B29K 307/04* | (2006.01) | |
| *B29L 31/32* | (2006.01) | |

(52) U.S. Cl.
CPC ........ *E05D 15/063* (2013.01); *B29C 45/0005* (2013.01); *B29C 45/14598* (2013.01); *B29K 2077/00* (2013.01); *B29K 2307/04* (2013.01); *B29L 2031/32* (2013.01); *E05Y 2201/688* (2013.01); *E05Y 2800/45* (2013.01); *E05Y 2800/67* (2013.01); *E05Y 2900/531* (2013.01)

(58) Field of Classification Search
CPC ........... E05Y 2900/531; E05Y 2800/67; E05Y 2800/45; E05Y 2201/688; B29L 2031/32; B29K 2077/00; B29C 45/14598; B29C 45/0005; E05D 15/063
See application file for complete search history.

(56) References Cited

U.S. PATENT DOCUMENTS

| | | | | |
|---|---|---|---|---|
| 4,294,490 A | * | 10/1981 | Woelfel | ................. B29C 53/60 428/113 |
| 4,294,639 A | * | 10/1981 | Woelfel | ............... B29C 70/003 264/258 |
| 4,724,950 A | * | 2/1988 | Okamura | ............... B65G 39/07 198/780 |
| 4,766,996 A | * | 8/1988 | Gibson | ................... B29C 43/18 492/50 |

(Continued)

FOREIGN PATENT DOCUMENTS

| | | |
|---|---|---|
| JP | 199473445 A | 10/1995 |
| JP | 08114216 A * | 5/1996 |

(Continued)

*Primary Examiner* — Christine M Mills
*Assistant Examiner* — Matthew J Sullivan
(74) *Attorney, Agent, or Firm* — FISHERBROYLES, LLP; Roger L. Browdy; Ronni S. Jillions (57) ABSTRACT

A roller including: a main body portion configured to include an outer ring and a rotatable inner ring on an inner circumferential side of the outer ring; and a covering portion disposed on an outer circumferential surface of the outer ring, the covering portion being made of a synthetic resin in which reinforced fibers are dispersed, wherein the covering portion includes a region in which arrangement directions of the reinforced fibers are aligned.

12 Claims, 9 Drawing Sheets

(56) References Cited

U.S. PATENT DOCUMENTS

| | | | | |
|---|---|---|---|---|
| 5,154,673 A | * | 10/1992 | Fukunaga | F16H 55/563 |
| | | | | 474/70 |
| 6,834,866 B2 | * | 12/2004 | van Egeraat | A63C 17/067 |
| | | | | 280/11.221 |
| 7,766,555 B2 | * | 8/2010 | Kono | F16C 19/26 |
| | | | | 384/577 |
| 7,895,748 B2 | | 3/2011 | Nomura et al. | |
| 11,000,977 B2 | * | 5/2021 | Takano | B60B 5/02 |
| 2004/0021366 A1 | * | 2/2004 | Colegrove | B60B 21/062 |
| | | | | 301/95.101 |
| 2005/0104441 A1 | * | 5/2005 | Bertelson | B29C 70/345 |
| | | | | 301/64.703 |
| 2007/0085239 A1 | | 4/2007 | Nomura et al. | |
| 2012/0312439 A1 | * | 12/2012 | Bournat | B60C 11/14 |
| | | | | 428/113 |
| 2015/0328922 A1 | * | 11/2015 | Dingle | B32B 5/12 |
| | | | | 156/60 |
| 2023/0128110 A1 | * | 4/2023 | Kumagai | B29C 45/14598 |
| | | | | 16/107 |

FOREIGN PATENT DOCUMENTS

| | | | | | |
|---|---|---|---|---|---|
| JP | 2006028882 A | | 2/2006 | | |
| JP | 2006328791 A | | 12/2006 | | |
| JP | 2007106004 A | | 4/2007 | | |
| JP | 2008168899 A | * | 7/2008 | | |
| JP | 2008297716 A | * | 12/2008 | | |
| JP | 2020051615 A | * | 4/2020 | | C08L 55/02 |

* cited by examiner

ROLLER

BACKGROUND OF THE INVENTION

Field of the Invention

The present invention relates to a roller, and the roller of the invention is suitably used as a guide roller for a sliding door of a vehicle, for example.

Description of Related Art

A sliding door of a vehicle is supported slidably along a side wall of a vehicle body by rollably engaging an upper guide roller provided at an upper front end portion of the sliding door, a center guide roller provided at a central portion in a height direction of a rear end, and a lower guide roller provided at a lower front end portion with an upper rail provided at an upper edge portion of a vehicle body opening, a center rail provided at a central portion in the height direction of a rear side wall of a vehicle body adjacent to the vehicle body opening, and a lower rail provided at a lower edge portion of the vehicle body opening, respectively, so that the sliding door can be slid to be opened and closed.

The guide rollers rolling along the rails provided on the vehicle body side are each composed of: a main body portion composed of a metallic inner ring and a metallic outer ring rotatably attached to an outer circumferential surface of the inner ring via a retainer retaining a bearing; and a synthetic resin covering portion covering the outer circumferential surface of the outer ring. According to this configuration, the metallic guide rail and the metallic outer ring are not in direct contact with each other, and the synthetic resin covering portion is interposed between the guide rail and the outer ring, so that quietness at the time of door opening and closing is improved.

As illustrated in FIG. 3 of JP 2006-328791 A, the guide roller of the sliding door is fixed by swaging to a tip end of an arm member at a front end of an upper edge of the sliding door, and is rotatably retained in a horizontal direction. However, a support shaft may be tilted by swinging of the arm member, so that the roller itself may be rolled while being tilted.

In order to improve the mechanical strength and durability of the covering portion, reinforced fibers may be added to the synthetic resin forming the covering portion (see JP 2007-106004 A).

CITATION LIST

Patent Documents

Patent document 1: JP 2006-328791 A
Patent document 2: JP 2006-28882 A
Patent document 3: JP 2007-106004 A
Patent document 4: JPU 1994-73445 A

SUMMARY OF THE INVENTION

According to the study of the present inventors, it has been found that the following problem is raised when the covering portion is formed of a synthetic resin material to which reinforced fibers are added.

When the guide roller is rolled in an inclined state, a shearing force acts such that the covering portion is away from the outer circumferential surface of the outer ring. Addition of reinforced fibers may cause the covering portion to be easily come off from the outer circumferential surface of the outer ring.

The reason is considered as follows.

Since the covering portion is injection-molded using the outer ring as an insert (see JP 2007-106004 A), the material for the covering portion is fixed and coupled to the outer circumferential surface of the outer ring in a biting manner by thermal shrinkage accompanying cooling of the synthetic resin material as a molding material.

When reinforced fibers are added to the synthetic resin, a thermal shrinkage rate of the synthetic resin is smaller than that of a synthetic resin to which no reinforced fiber is added. This is because the reinforced fibers themselves hardly shrink.

Therefore, an object of the present invention is to maintain a coupling force between a covering portion formed of a synthetic resin to which reinforced fibers are added and an outer circumferential surface of an outer ring while maintaining mechanical strength and durability by the reinforced fibers.

In order to achieve such an object, a first aspect of the present invention is defined as follows.

A roller including:
  a main body portion configured to include an outer ring and a rotatable inner ring on an inner circumferential side of the outer ring; and
  a covering portion disposed on an outer circumferential surface of the outer ring,
  the covering portion being made of a synthetic resin in which reinforced fibers are dispersed,
  wherein the covering portion includes a region in which arrangement directions of the reinforced fibers are aligned.

In the roller of the first aspect defined as above, the covering portion includes the region in which the arrangement directions of the reinforced fibers are aligned. In this region, there is no element which inhibits the shrinkage of the synthetic resin in a direction perpendicular to the direction in which the reinforced fibers are aligned.

Therefore, by controlling the direction in which the reinforced fibers are aligned, the coupling force of the forming material constituting the region to the outer circumferential surface of the outer ring can be secured.

In the covering portion, the region where the reinforced fibers are aligned is preferably in contact with the outer circumferential surface of the outer ring (second aspect).

This is to secure the coupling force to the outer circumferential surface by the region.

When another region (for example, a region in which reinforced fibers are randomly dispersed) exists between the region and the outer circumferential surface, the effect of improving the coupling force by the region in which the reinforced fibers are aligned cannot be expected.

In the region in which the reinforced fibers are aligned, the arrangement directions of the reinforced fibers preferably have an angle of 0 degrees to 50 degrees with respect to the outer circumferential surface of the outer ring (third aspect).

Maintenance of the angle can remove the influence of the reinforced fibers that inhibit thermal shrinkage of the synthetic resin. In general, as the angle with respect to the outer circumferential surface is smaller, the coupling force is strengthened.

The angles of arrangement of all the reinforced fibers contained in the region are preferably constant with respect to the outer circumferential surface, but, in the region, the reinforced fibers may be dispersed within the above-described angle range of 0 to 50 degrees.

A fourth aspect of the present invention is defined as follows. The roller according to any one of the first to third aspects, wherein a flange portion is formed on the outer ring, the region includes a first region in which the reinforced fibers are aligned in a first direction and a second region in which the reinforced fibers are aligned in a second direction, the second region is disposed closer to the flange portion than the first region, and, when an angle between the outer circumferential surface of the outer ring and the first direction is 0 degrees to 50 degrees, an angle of the second direction with respect to the outer circumferential surface is 130 degrees to 180 degrees.

The roller of the fourth aspect defined as above includes the first region and the second region as regions in which the reinforced fibers are aligned. When an angle between the outer circumferential surface of the outer ring and the first direction of the reinforced fibers in the first region is 0 degrees to 50 degrees, an angle between the outer circumferential surface and the second direction of the reinforced fibers in the second region (as a rotation angle in a direction identical with the first direction) is 130 degrees to 180 degrees. Here, an angle formed between the first direction of the reinforced fibers in the first region and the outer circumferential surface and an angle formed between the second direction of the reinforced fibers in the second region and the outer circumferential surface are both 0 degrees to 50 degrees.

When the flange portion is formed on the outer ring, the second region is disposed closer to the flange portion than the first region.

In order to strengthen the coupling forces of the first region and the second region to the outer circumferential surface of the outer ring, a stepped portion is preferably provided on the outer circumferential surface (sixth aspect). This is because, by providing the step, the material for the covering portion strongly bites the outer circumferential surface at the time of thermal shrinkage, so that the coupling force is improved.

The shape of the stepped portion can be arbitrarily designed, and, for example, a weir portion can be provided on a side of one side surface of the outer circumferential surface (seventh aspect). In addition, a flange portion may be provided on another side surface of the outer circumferential surface, and a recess portion continuous with the flange portion may be formed (eighth aspect).

A weir portion and a recess portion may be provided together (ninth aspect).

A fifth aspect of the present invention is defined as follows. The roller according to any one of the first to fourth aspects, wherein one side surface of the outer ring is covered with the covering portion, the reinforced fibers are aligned in a side surface covering region covering the side surface, and an angle of the reinforced fibers is within ±10 degrees assuming that a direction away from the side surface toward an outer circumferential surface of the covering portion is +.

According to the roller of the fifth aspect defined as above, the reinforced fibers are aligned at an angle within a predetermined range along the side surface in the side surface covering region. Therefore, the thermal shrinkage of the forming material for the side surface covering region is not inhibited by the reinforced fibers. Accordingly, the side surface covering region is coupled to the side surface of the outer ring with a strong force.

A tenth aspect of the present invention is defined as follows. A method for manufacturing a roller which includes:
  a main body portion configured to include an outer ring and a rotatable inner ring on an inner circumferential side of the outer ring; and
  a covering portion disposed on an outer circumferential surface of the outer ring,
  the covering portion being made of a synthetic resin in which reinforced fibers are dispersed,
  the method including
  a step of setting a mold covering a periphery of the outer ring by using the outer ring as an insert, wherein an inflow path of a forming material for the covering portion is formed between the mold and a side surface of the outer ring,
  wherein the forming material includes the synthetic resin and the reinforced fibers, and the reinforced fibers are inclined with respect to the side surface when the forming material is allowed to pass through the inflow pass.

The tenth aspect defined as above is suitable for manufacturing the roller defined in any of the first to ninth aspects.

In the method, inclination angles of the reinforced fibers when passing through the inflow path are within ±10 degrees, assuming that a direction away from the side surface toward an outer circumferential surface of the covering portion is +(eleventh aspect).

When the inclination angles of the reinforced fibers are dispersed within a predetermined range in this manner, the arrangement directions of the reinforced fibers could be aligned in a region facing the outer circumferential surface of the outer ring of the covering portion.

BRIEF DESCRIPTION OF THE DRAWINGS

FIGS. 4A and 4B illustrate a roller of another embodiment, the roller including a weir portion on an outer circumferential surface of an outer ring, in which

FIGS. 5A and 5B illustrate a roller of another embodiment, the roller including a recess portion on an outer circumferential surface of an outer ring, in which

FIGS. 6A and 6B illustrate a method for manufacturing a roller, in which

FIGS. 7A and 7B illustrate another method for manufacturing a roller, in which

FIGS. 9A and 9B are schematic views illustrating the arrangement directions of the reinforced fibers and a shrinkage direction of a forming material in the roller of FIG. 8, in which

DETAILED DESCRIPTION OF PREFERRED EMBODIMENTS

Figure 1:
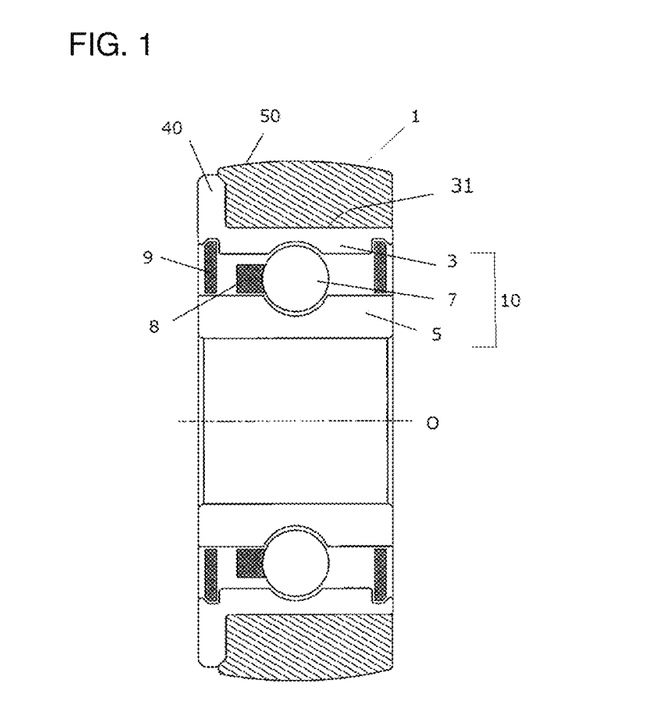
FIG. 1 is a cross-sectional view illustrating a configuration of a roller according to an embodiment of the present invention.

FIG. 1 illustrates a roller 1 according to an embodiment of the present invention. The roller 1 is used as a guide roller for use in a sliding door of a vehicle.

The roller 1 includes a main body portion 10 and a covering portion 50.

The main body portion 10 includes an outer ring 3, an inner ring 5, and a bearing 7. The inner ring 5 is rotatably attached to an inner circumferential side of the outer ring 3 via the bearing 7 retained by a retainer 8. A reference numeral 9 denotes a seal ring, which prevents grease from leaking from between the outer ring 3 and the inner ring 5, and prevents dust and other foreign matters from entering between the outer ring 3 and the inner ring 5.

The outer ring 3, the inner ring 5, and the bearing 7 are made of an Fe alloy such as general-purpose bearing steel (SUJ2) or stainless steel (SUS). By applying high-frequency quenching treatment to the outer ring 3 and the inner ring 5, the outer ring 3 and the inner ring 5 are easily fixed by swaging to a support shaft, and wear resistance to the bearing 7 is secured.

In the example of FIG. 1, an outer circumferential surface 31 of the outer ring 3 is a flat surface, and a flange portion 40 is formed on an outer side surface thereof. The flange portion 40 can also be omitted. In the example of FIG. 1, the outer circumferential surface 31 is parallel to a rotation axis O of the outer ring 3, but the outer circumferential surface 31 can be inclined with respect to the rotation axis O or a step can be provided on the outer circumferential surface.

The covering portion 50 is externally mounted on the outer circumferential surface 31 of the outer ring 3.

The covering portion 50 is formed by dispersing reinforced fibers in a synthetic resin as a matrix.

In the example of FIG. 1, a polyamide resin was employed as the synthetic resin, and materials: carbon fiber particles, fiber length: 6 mm, fiber thickness: 10 μm were employed as the reinforced fibers. A blending proportion of the reinforced fibers is 15% by mass with respect to the entire forming material.

Dimensions of each element are as follows.

An outer diameter of the entire roller is set to Φ12 mm or more and Φ29 mm or less; an outer diameter of the outer circumferential surface 31 of the outer ring 3 is set to Φ10 mm or more and Φ25 mm or less; an outer diameter of the flange portion 40 is set to Φ12 mm or more and Φ25 mm or less; a thickness of the flange portion 40 is set to 0.5 mm or more and 3.0 mm or less; a width in an axial direction is set to 5 mm or more and 10 mm or less; and the outer diameter of the flange portion 40 is set to be smaller than the outer diameter of the guide roller.

Examples of the synthetic resin that can be employed in the covering portion 50 include the following resins:

a polyamide resin, a polyacetal resin, a polyether ether ketone resin, a polyphenylene sulfide resin, a phenol resin, an epoxy resin, a urea resin, a melamine resin, an unsaturated polyester resin, a polyimide resin, and a diallyl phthalate resin.

The reinforced fibers added to the covering portion are preferably composed of one or more selected from glass fiber particles, ceramic fiber particles, carbon fiber particles, aramid fiber particles, acrylic fiber particles, and polyvinyl alcohol fiber particles.

The blending proportion of the reinforced fibers is set to 5% by mass or more and 30% by mass or less with respect to a total mass of the covering portion.

An average fiber length is preferably 6 mm.

An average fiber thickness is preferably 10 μm.

In addition, one or more solid lubricants selected from graphite, molybdenum disulfide, tungsten disulfide, boron nitride, and polytetrafluoroethylene can be blended in the forming material for the covering portion 50.

Figure 2A:
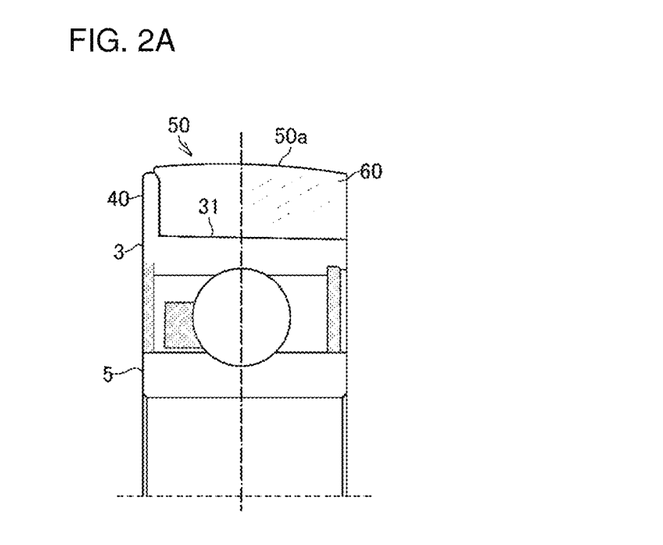
FIGS. 2A to 2C are schematic diagrams for explaining a first region in a covering portion of the roller, in which FIG. 2A explains a structure of the roller, FIG. 2B explains the first region, and FIG. 2C explains a shrinkage direction of a forming material in the first region.

As illustrated in FIG. 2A, the covering portion 50 of the present invention includes a first region 50aE1 in which reinforced fibers 60 are inclined with respect to the outer circumferential surface 31 and aligned in a region 50a covering substantially a half region of a region on a side opposite to the flange (right side in the figure) in the outer circumferential surface 31 of the outer ring 3.

Figure 2B:
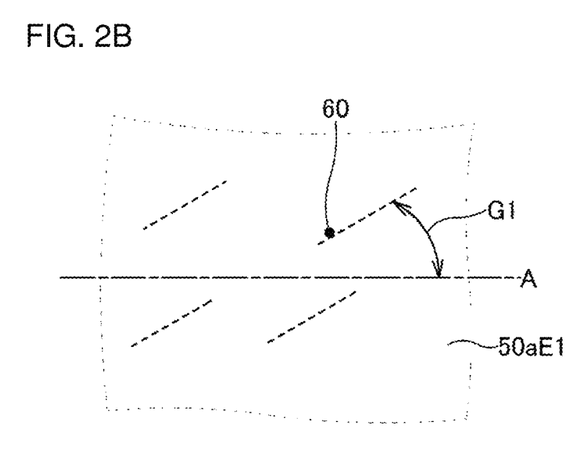

FIG. 2B is an enlarged view of the first region 50aE1. In the first region 50aE1, the reinforced fibers 60 are arranged in the same direction. In this example, a formed angle G1 is about 30 degrees with respect to the outer circumferential surface 31 of the outer ring 3. A reference line A in the figure is parallel to the outer circumferential surface 31 of the outer ring 3. When irregularities are formed on the outer circumferential surface 31, the reference line A is parallel to a flat portion occupying the maximum area.

For the arrangement directions of the reinforced fibers 60, the formed angle G1 can be arbitrarily set within a range of 0 degrees to 50 degrees. In addition, the arrangement directions may be dispersed within this range.

In the first region 50aE1 as a part of the opposite-to-flange side region 50a of the covering portion 50, the reinforced fibers 60 only need to be aligned at a desired angle, as illustrated in FIG. 2B.

Figure 2C:
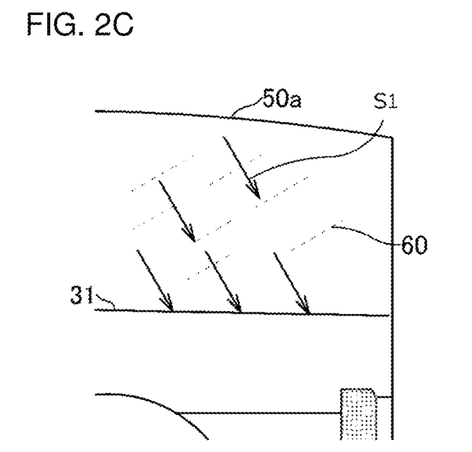

In the first region 50aE1, thermal shrinkage of the synthetic resin is not inhibited in a direction indicated by arrows in FIG. 2C, that is, in a direction perpendicular to the arrangement directions of the reinforced fibers 60. In other words, shrinkage inhibition of the synthetic resin by the reinforced fibers does not occur.

As a result, a strong coupling force is generated between the forming material for the covering portion 50 and the outer circumferential surface 31 of the outer ring 3.

The first region 50aE1 illustrated in FIG. 2B is preferably in contact with the outer circumferential surface 31 of the outer ring 3. This is because the shrinkage effect of the forming material directly acts on the outer circumferential surface 31.

In the cross section of the covering portion 50, a range from the outer circumferential surface 31 to a distance of ⅓ of the maximum thickness in the thickness direction of the covering portion 50 is defined as 50k.

In the 50k, preferably, a region in which a proportion of the number of reinforced fibers in an orientation angle range of 0 to 50 degrees is 40% or more, in the opposite-to-flange side region 50a, is the first region 50aE1. The first region 50aE1 has a proportion of the reinforced fibers of 40% or more, and thus thermal shrinkage of the forming material for the covering portion 50 can be efficiently caused, and the covering portion 50 can be firmly coupled to the outer circumferential surface 31.

The first region 50aE1 more preferably has a proportion of the number of reinforced fibers in the orientation angle range of 0 to 50 degrees of 80% or less. When the first region 50aE1 has a proportion of the number of reinforced fibers in the orientation angle range of 0 to 50 degrees of more than 80%, the degree of forming material shrinkage improvement becomes gentle.

Figure 3A:
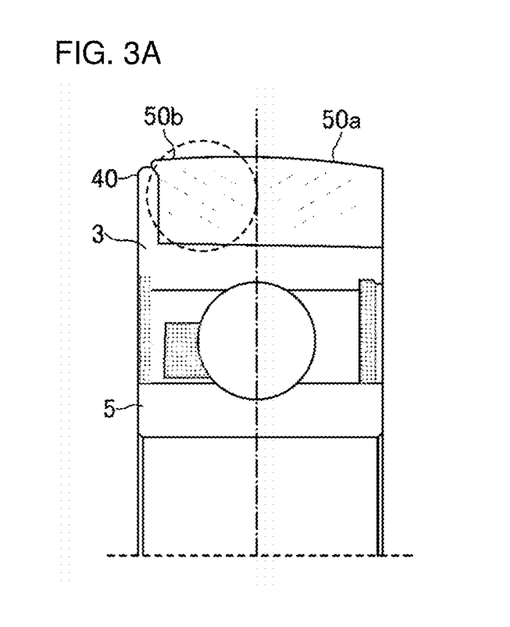
FIGS. 3A to 3C are schematic diagrams for explaining a second region in the covering portion of the roller, in which FIG. 3A explains a structure of the roller, FIG. 3B explains the second region, and FIG. 3C explains a shrinkage direction of a forming material in the second region.

As illustrated in FIG. 3A, the covering portion 50 of the present invention includes a second region 50bE1 in which the reinforced fibers 60 are inclined with respect to the outer circumferential surface 31 and aligned in a region 50b covering substantially a half region of the outer side (flange portion 40 side) on the outer circumferential surface 31 of the outer ring 3.

Figure 3B:
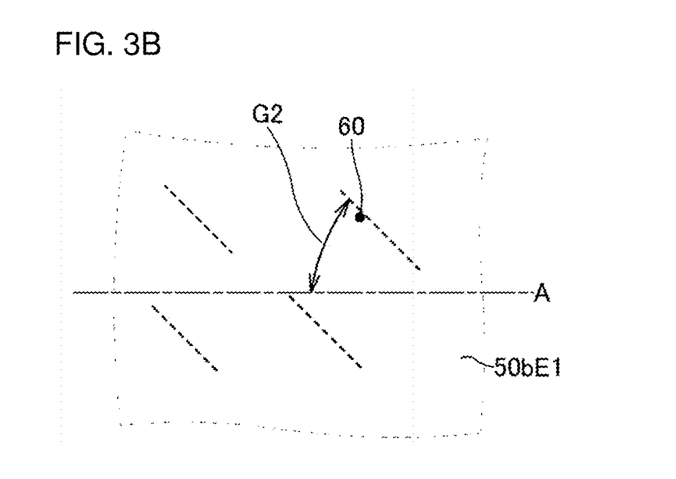

FIG. 3B is an enlarged view of the second region 50bE1. In the second region 50bE1, the reinforced fibers 60 are arranged in the same direction. A formed angle G2 is about 30 degrees with respect to the outer circumferential surface 31 of the outer ring 3. When the angle (rotation angle) of the reinforced fibers 60 with respect to the outer circumferential surface 31 in the first region 50aE1 illustrated in FIG. 2B is 30 degrees, the angle between the reinforced fibers and the outer circumferential surface 31 in the second region 50bE1 is 150 degrees.

Also in the second region 50bE1, the formed angle G2 can be arbitrarily set within a range of 0 degrees to 50 degrees, for the arrangement directions of the reinforced fibers 60. In addition, the arrangement directions may be dispersed within this range.

In the second region 50bE1 as a part of the outer region 50b of the covering portion 50, the reinforced fibers 60 only need to be aligned at an angle with a certain range, as illustrated in FIG. 3B.

Figure 3C:
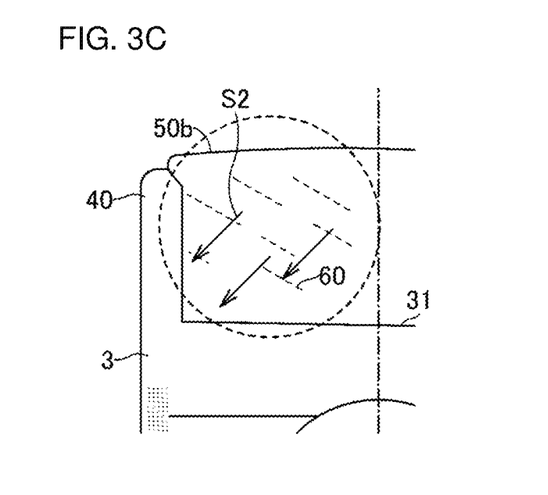

In the second region 50bE1, thermal shrinkage of the synthetic resin is not inhibited in a direction indicated by arrows in FIG. 3C, that is, in a direction perpendicular to the arrangement directions of the reinforced fibers 60. In other words, shrinkage inhibition of the synthetic resin by the reinforced fibers does not occur.

As a result, a strong coupling force is generated between the resin material for the covering portion 50 and the outer circumferential surface 31 of the outer ring 3.

The second region 50bE1 illustrated in FIG. 3B is preferably in contact with the outer circumferential surface 31 of the outer ring 3. This is because the shrinkage effect of the synthetic resin directly acts on the outer circumferential surface 31.

In the above-described 50k, preferably, a region in which a proportion of the number of reinforced fibers in an orientation angle range of 0 to 50 degrees is 40% or more, in the flange side region 50b, is the second region 50bE1.

The second region 50bE1 has a proportion of the reinforced fibers of 40% or more, and thus thermal shrinkage of the forming material for the covering portion 50 can be efficiently caused, and the covering portion 50 can be firmly coupled to the outer circumferential surface 31.

The second region 50bE1 more preferably has a proportion of the number of reinforced fibers in the orientation angle range of 0 to 50 degrees of 80% or less. When the second region 50bE1 has a proportion of the number of reinforced fibers in the orientation angle range of 0 to 50 degrees of more than 80%, the degree of forming material shrinkage improvement becomes gentle.

In the examples of FIGS. 1 to 3, each of the opposite-to-flange side region 50a including the first region 50aE1 and the outer region 50b including the second region 50bE1, in the covering portion 50, occupies a half region of the outer circumferential surface 31, but the present invention is not limited to this configuration.

Figure 4A:
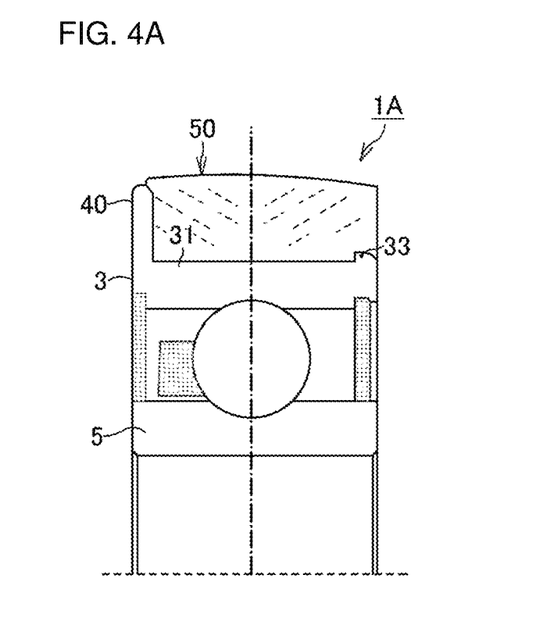
FIG. 4A is a cross-sectional view illustrating a configuration thereof.
Figure 4B:
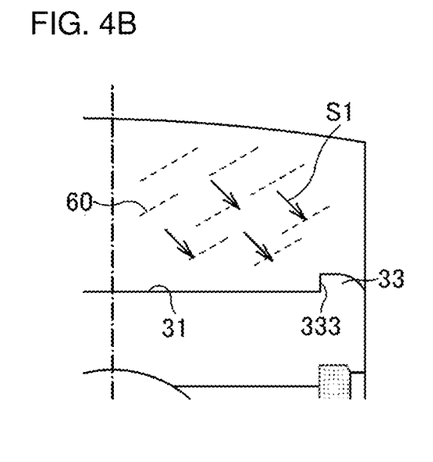
FIG. 4B is a partially enlarged cross-sectional view thereof.

FIG. 4 illustrates a roller 1A in which a weir portion 33 is provided on a side (right side in the figure) opposite to the flange of the outer circumferential surface 31 of the outer ring 3. The same elements as those in FIG. 2 are denoted by the same reference numerals, and the description thereof will be omitted.

Due to the presence of the weir portion 33, in particular, the synthetic resin material shrunk toward a region sandwiched between the outer circumferential surface 31 and an upright surface 333 of the weir portion 33 is held between both these surfaces, and a strong coupling force is secured in this region.

Figure 5A:
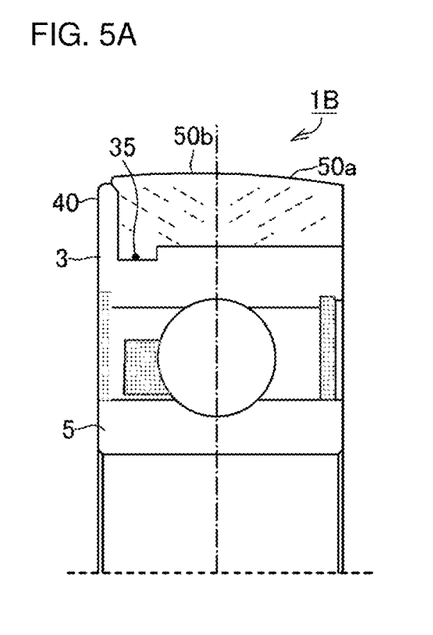
FIG. 5A is a cross-sectional view illustrating a configuration thereof.
Figure 5B:
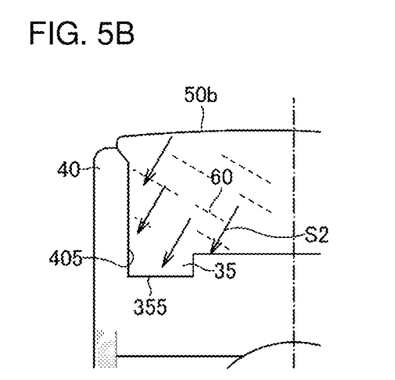
FIG. 5B is a partially enlarged cross-sectional view thereof.

FIG. 5 illustrates a roller 1B in which a recess portion 35 continuous with the flange portion 40 is provided outside the outer circumferential surface 31 of the outer ring 3. The same elements as those in FIG. 3 are denoted by the same reference numerals, and the description thereof will be omitted.

Due to the presence of the recess portion 35, in particular, the synthetic resin material shrunk toward a region sandwiched between a bottom surface 355 of the recess portion 35 and an inner upright surface 405 of the flange portion 40 is held between both these surfaces, and a strong coupling force is secured in this region.

Figure 6A:
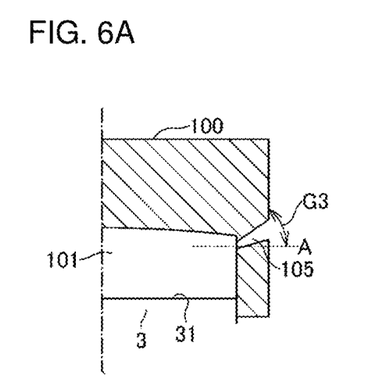
FIG. 6A is a cross-sectional view illustrating a structure of a mold.
Figure 6B:
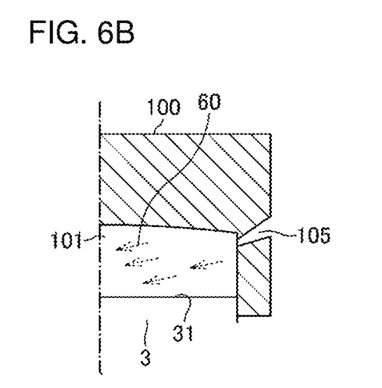
FIG. 6B is a schematic view illustrating arrangement directions of reinforced fibers at the time of material injection.

FIG. 6 illustrates an example of a method for manufacturing the covering portion 50 as illustrated in FIGS. 1 to 5.

FIG. 6A illustrates a state in which the outer ring 3 is set as a core in a mold 100. A cavity 101 of the mold 100 forms the covering portion 50. A reference numeral 105 denotes a runner, which is provided to be inclined on an upper end side of a side surface of the cavity 101. An inclination angle G3 is set to 0 to 50 degrees with respect to the reference line A substantially parallel to the outer circumferential surface 31 of the outer ring 3. By providing the runner 105 with the inclination angle G3, the first region 50aE1 can be formed in the covering portion 50.

That is, when the forming material (synthetic resin+reinforced fibers) for the covering portion 50 is injected from the runner 105, for example, in the case of a material based on a polyamide resin, the arrangement directions of the reinforced fibers can be aligned, as illustrated in FIG. 6B, for example, by employing basic settings:
a mold temperature: 80° C. or higher and 150° C. or lower;
an injection pressure: 50% or more of the specification of an injection molding machine; and
a cylinder temperature: (rear, middle, front, nozzle) 280° C. or higher and 320° C. or lower, and finely adjusting other various conditions.

The forming material injected as illustrated in FIG. 6B advances to the left side in the figure while being bounced back on the outer circumferential surface 31 of the outer ring 3 in a state where the arrangement directions of the reinforced fibers 60 are aligned. As a result, as illustrated in FIG. 3, the second region 50bE1 in which the reinforced fibers 60 are arranged at an angle with respect to the outer circumferential surface 31 is formed.

Figure 7A:
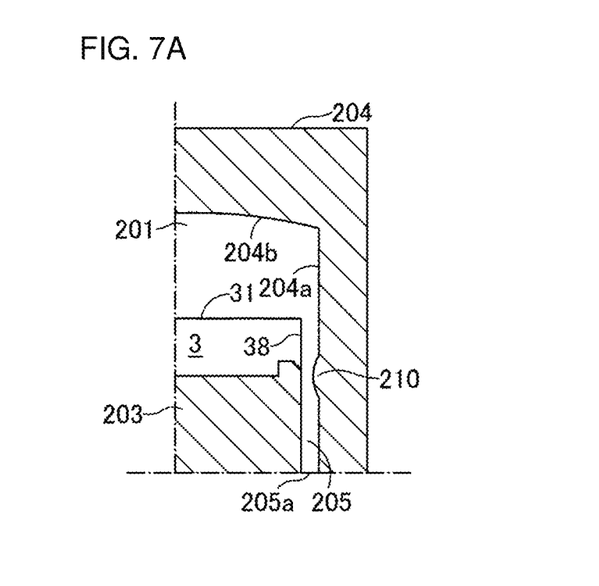
FIG. 7A is a cross-sectional view illustrating a structure of a mold.
Figure 7B:
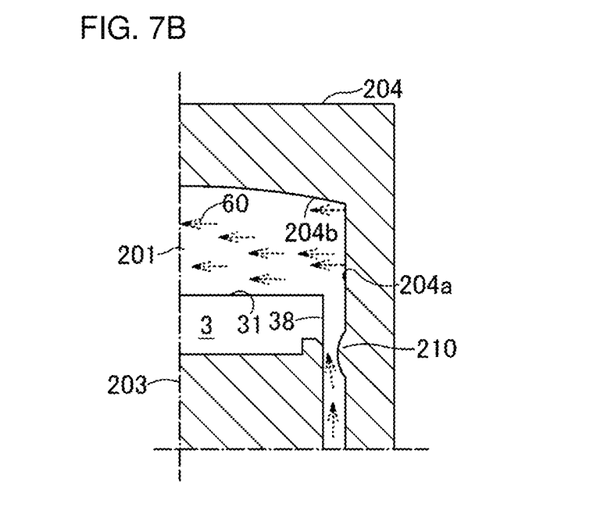
FIG. 7B is a schematic view illustrating arrangement directions of reinforced fibers at the time of material injection.

FIG. 7 illustrates another manufacture method.

A cavity 201 of the covering portion 50 is formed between a lower mold 203 and an upper mold 204. The outer ring 3 is set as an insert in the lower mold 203.

A film gate 205 is provided between the lower mold 203 and the upper mold 204.

Assuming that the forming material for the covering portion 50 is injected from below in FIG. 7, the gate 205 is narrowed immediately upstream of a side surface 38 of the outer ring 3 as the core.

The same injection conditions as in the example of FIG. 6 may be employed.

In this example, as indicated by reference numeral 210 in FIG. 7, a bulging portion 210 having an elliptical cross section is formed on the upper mold 204 side to narrow the flow path of the gate. Here, when the forming material passes through the bulging portion 210, the reinforced fibers are aligned in a flow direction. The forming material flowing along the bulging portion 210 then collides with the side surface 38 and reflects. As a result, disturbance occurs in the arrangement directions of the reinforced fibers. The disturbance is preferably ±10 degrees, assuming that a direction away from the side surface 38 toward the outer circumferential surface 31 is +

As described above, the disturbance in a narrow range is generated in the arrangement directions of the reinforced fibers in the forming material in a state of passing through the side surface 38 of the outer ring 3, thereby making it possible to form a region (first region) in which the reinforced fibers are aligned at a predetermined angle in a portion covering the outer circumferential surface 31 of the outer ring 3 in the cavity 201 as illustrated in FIG. 7B.

According to the study of the present inventors, when a gate having a width of 1 to 3 mm was used in an introduction portion 205a, the width was reduced to approximately 0.2 to 0.5 mm in the bulging portion 210.

When the gate width is reduced, the reinforced fibers in the forming material are aligned. In order to form the first region in the portion covering the outer circumferential surface 31, it is considered necessary to cause the reinforced fibers aligned in this manner to collide with the side surface 38 of the outer ring 3 using the circumferential surface of the bulging portion 210 formed on the upper mold 204 side. The flow of the forming material reflected by the side surface 38 flows along a cavity surface 204a of the upper mold 204 facing the side surface 38, and is then further reflected by a cavity surface 204b facing the outer circumferential surface 31 to define the arrangement directions of the reinforced fibers in the first region.

The bulging portion 210 has a function of aligning the reinforced fibers in the forming material in the flow direction and causing the forming material to collide with the side surface 38 of the outer ring 3.

The first region is not formed in the portion covering the outer circumferential surface 31 simply by reducing the width of the gate. That is, the direction of the reinforced fibers is random in the portion covering the outer circumferential surface 31. The same applies to a case where the width of the gate is not reduced (an example of JP 2007-106004 A).

Figure 8:
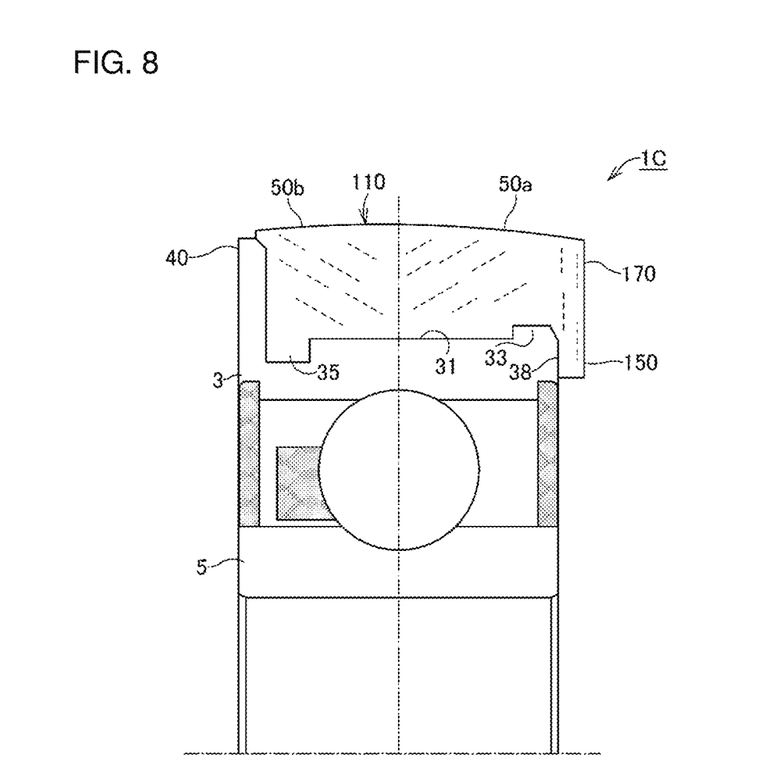
FIG. 8 is a cross-sectional view illustrating a roller of another embodiment.

FIG. 8 is a partial cross-sectional view of a roller 1C obtained by applying the manufacture method described with reference to FIG. 7. The same elements as those in the previous figures are denoted by the same reference numerals, and the description thereof will be omitted.

The roller 1C includes a weir portion 33 and a recess portion 35 on the outer circumferential surface 31 of the outer ring 3.

A covering portion 110 of this example includes a side surface covering region 150 covering the side surface 38 of the outer ring 3 and a third region 170 on an outer circumferential side thereof, in addition to the region 50a including the first region and the region 50b including the second region.

Figure 9A:
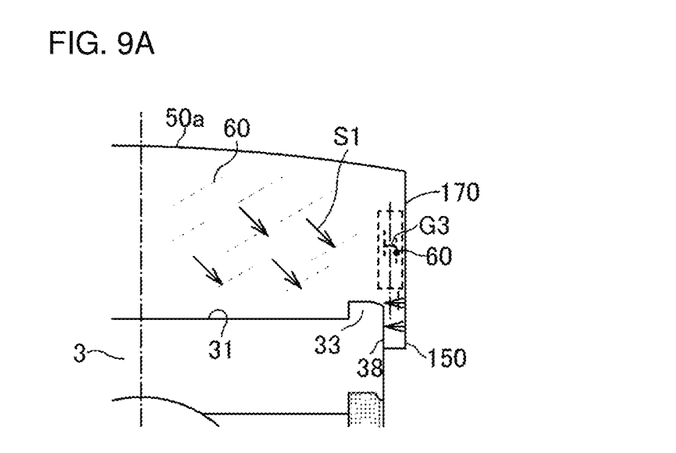
FIG. 9A is a cross-sectional view for explaining a main part.

In the side surface covering region 150, shrinkage of the forming material toward the side surface 38 is promoted as indicated by the angle G3 in FIG. 9. On the other hand, since shrinkage of the forming material at an angle S1 is promoted in the first region, shrinkage of the forming materials occurs so as to sandwich the weir portion 33. As a result, a strong coupling force can be secured between the covering portion 110 and the outer ring 3.

Figure 9B:
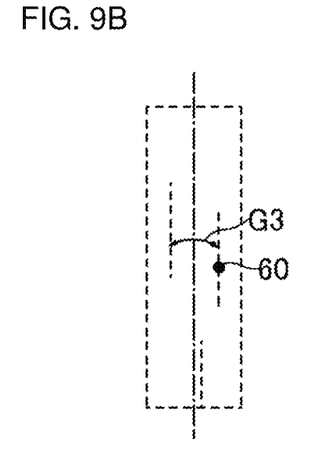
FIG. 9B is a schematic view for explaining arrangement directions of reinforced fibers in a side surface covering region.

FIG. 9B is a partially enlarged view of the side surface covering region 150. In the side surface covering region 150, the arrangement directions of the reinforced fibers 60 have an angle of ±10 degrees with respect to a reference line B.

The reference line B is parallel to the side surface 38 of the outer ring 3.

The arrangement directions of such reinforced fibers are maintained also in the third region on the outer circumferential side (upper side in FIG. 9) from the side surface covering region 150.

The present invention is not limited to the description of the embodiments of the invention. Various modifications are also included in the present invention as long as those skilled in the art can easily conceive them without departing from the recitation of the claims. A device using a bearing mechanism, such as an internal combustion engine, using the sliding member of the present invention exhibits excellent sliding characteristics.

DESCRIPTION OF THE REFERENCE NUMERALS 1, 1A, 1B, 1C Roller
3 Outer ring
5 Inner ring
10 Main body portion
31 Outer circumferential surface
33 Weir portion
35 Recess portion
38 Side surface
40 Flange portion
50, 110 covering portion
50aE1 First region
50bE1 Second region
60 Reinforced fibers
150 Side surface covering region
170 Third region

What is claimed is:

1. A roller including:
a main body portion comprising an outer ring and a rotatable inner ring on an inner circumferential side of the outer ring; and
a covering portion disposed on an outer circumferential surface of the outer ring,
the covering portion being made of a synthetic resin in which reinforced fibers are dispersed by injection molding using a forming material that includes the synthetic resin and the reinforced fibers,
wherein the covering portion includes a region in which arrangement directions of the reinforced fibers are aligned,
wherein, in the region, the reinforced fibers are disposed in parallel with one another at an angle of 0 degrees to 50 degrees with respect to a radial direction of the outer ring over an outer circumferential surface of the outer ring.

2. The roller according to claim 1, wherein the region is in contact with the outer circumferential surface of the outer ring.

3. The roller according to claim 1, wherein a flange portion is formed on the outer ring, the region includes a first region in which the reinforced fibers are aligned in a first direction and a second region in which the reinforced fibers are aligned in a second direction, the second region is disposed closer to the flange portion than the first region, and, when an angle between the outer circumferential surface of the outer ring and the first direction is 0 degrees to 50 degrees, an angle of the second direction with respect to the outer circumferential surface (as a rotation angle in a direction identical with the first direction) is 130 degrees to 180 degrees.

4. The roller according to claim 3, wherein a recess portion continuous with the flange portion is formed on the outer circumferential surface, a weir portion is formed on a side surface opposite to the flange portion of the outer circumferential surface, the first region covers the weir portion, and the second region covers the recess portion.

5. The roller according to claim 1, wherein one side surface of the outer ring is covered with the covering portion, the reinforced fibers are aligned in a side surface covering region covering the side surface, and an angle of the reinforced fibers is within ±10 degrees assuming that a direction away from the side surface toward an outer circumferential surface of the covering portion is a positive direction.

6. The roller according to claim 1, wherein a stepped portion is formed on the outer circumferential surface of the outer ring.

7. The roller according to claim 6, wherein a weir portion is formed on a side of the one side surface of the outer circumferential surface.

8. The roller according to claim 7, wherein a flange portion is provided on another side surface of the outer circumferential surface, and a recess portion continuous with the flange portion is formed.

9. A method for manufacturing a roller which includes:
a main body portion configured to include an outer ring and a rotatable inner ring on an inner circumferential side of the outer ring; and
a covering portion disposed on an outer circumferential surface of the outer ring,
the covering portion being made of a synthetic resin in which reinforced fibers are dispersed,
the method including
a step of setting a mold covering a periphery of the outer ring by using the outer ring as an insert, wherein an inflow path of a forming material for the covering portion is formed between the mold and a side surface of the outer ring, and
a step of injection molding the roller by injecting the forming material into the inflow path, wherein the forming material includes the synthetic resin and the reinforced fibers, and the reinforced fibers are inclined with respect to the side surface when the forming material is allowed to pass through the inflow path, by forming a region of the outer circumferential surface of the outer ring is formed in which the reinforced fibers are arranged parallel with one another and at an angle of 0 degrees to 50 degrees with respect to a radial direction of the outer ring over the outer circumferential surface of the outer ring whereby thermal shrinkage of the forming material in the region is not inhibited by the reinforced fibers in a direction perpendicular to the arrangement directions of the reinforced fibers and a coupling force of the covering portion with respect to the outer circumferential surface of the outer ring is strengthened.

10. The method for manufacturing a roller according to claim 9, wherein inclination angles of the reinforced fibers when passing through the inflow path are within ±10 degrees assuming that a direction away from the side surface toward an outer circumferential surface of the covering portion is a positive direction.

11. A method for manufacturing a roller which includes:
a main body portion configured to include an outer ring and a rotatable inner ring on an inner circumferential side of the outer ring; and
a covering portion disposed on an outer circumferential surface of the outer ring,
the covering portion being made of a synthetic resin in which reinforced fibers are dispersed,
the method including
a step of setting a mold covering a periphery of the outer ring by using the outer ring as an insert, wherein an inflow path of a forming material for the covering portion is formed between the mold and a side surface of the outer ring,
using the forming material including the synthetic resin and the reinforced fibers, and
providing a bulging portion formed on a side of the mold to narrow the flow path by which the forming material flowing along the bulging portion then collides with the side surface and reflects during injection molding, such that the reinforced fibers are disposed in parallel with one another at an angle of 0 degrees to 50 degrees with respect to a radial direction of the outer ring over an outer circumferential surface of the outer ring whereby thermal shrinkage of the forming material in the region is not inhibited by the reinforced fibers in a direction perpendicular to the arrangement directions of the reinforced fibers and a coupling force of the covering portion with respect to the outer circumferential surface of the outer ring is strengthened.

12. The method for manufacturing a roller according to claim 11, wherein inclination angles of the reinforced fibers when passing through the inflow path are within ±10 degrees assuming that a direction away from the side surface toward an outer circumferential surface of the covering portion is a positive direction.

* * * * *